J. T. FULLER, DEC'D.
C. D. GORDON, ADMINISTRATOR.
CYLINDER FOR COTTON GINS.
APPLICATION FILED APR. 13, 1910.
1,035,821.
Patented Aug. 13, 1912.
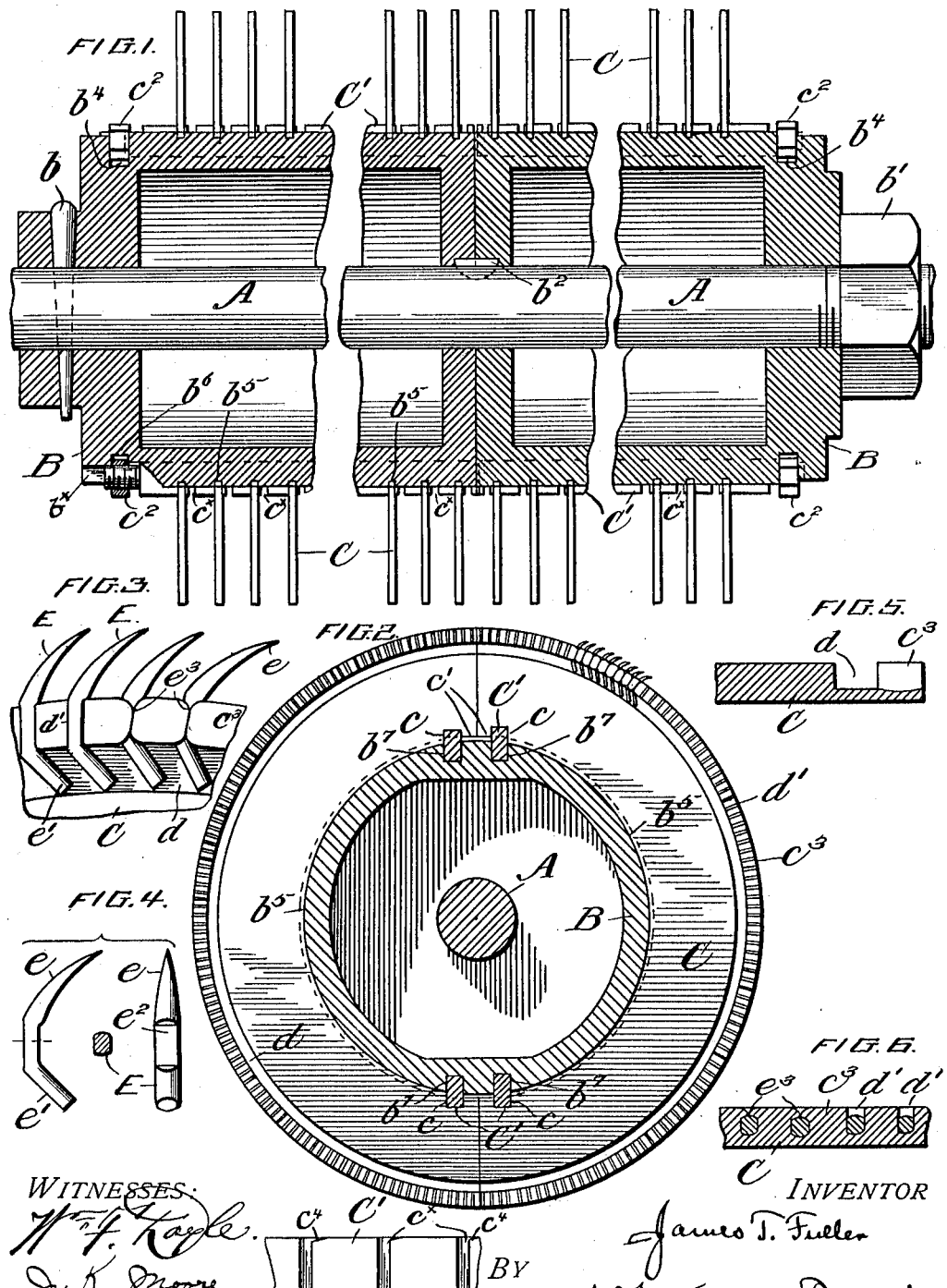

UNITED STATES PATENT OFFICE.

JAMES T. FULLER, OF CHATTANOOGA, TENNESSEE; CHARLES D. GORDON, OF CHATTANOOGA, TENNESSEE, ADMINISTRATOR OF SAID FULLER, DECEASED, ASSIGNOR TO L. T. FULLER AND MARY J. FULLER, OF HOUSTON, TEXAS.

CYLINDER FOR COTTON-GINS.

1,035,821. Specification of Letters Patent. Patented Aug. 13, 1912.

Application filed April 13, 1910. Serial No. 555,263.

*To all whom it may concern:*

Be it known that I, JAMES T. FULLER, citizen of the United States, residing at Chattanooga, in the county of Hamilton and State of Tennessee, have invented certain new and useful Improvements in Cylinders for Cotton-Gins; and I do hereby declare the following to be a full, clear, and exact description of the invention, such as will enable others skilled in the art to which it appertains to make and use the same.

My present invention relates to toothed cylinders for cotton gins and more particularly to cylinders in which the teeth are composed of rounded and polished needles of steel or other hard metallic substance.

Heretofore the toothed disks of cotton gins have been secured to the shaft or main body of the cylinder in such manner that in case it was desired to remove a disk, all of the disks between such disk and an end of the cylinder would have to be removed to permit said disk to be taken from the shaft or main body of the cylinder.

One of the objects of my said invention is to provide means whereby a disk can be removed from the cylinder without disturbing any other of the disks.

Another object of said invention is to provide a strong and durable method of securing needle points to the disks to serve as the teeth for the same.

In the accompanying drawing I have illustrated the best form in which I have contemplated embodying my invention and said invention is disclosed in the following description and claims.

In the said drawings, Figure 1 is a longitudinal section of my improved gin cylinder with parts broken away. Fig. 2 is a transverse section taken between two disks of the cylinder. Fig. 3 is a side view of a part adjacent to the periphery of a disk, showing two teeth placed in the radial grooves of the disk, and two teeth finally secured therein. Fig. 4 shows a side section and front view of a single tooth. Fig. 5 is a short section of a disk at its periphery on a radial line, and Fig. 6 is a section of the same on a line at right angles to the section in Fig. 5. Fig. 7 is a plan view of a part of one of the locking bars illustrating a detail of the construction of the same.

In the drawings A is the cylinder shaft and B a cylindrical body mounted thereon. In this instance, the cylinder is made of two parts. These two parts of the cylinder B are firmly secured to the shaft to move therewith in any preferred manner. I have here shown them secured at one end by a pin $b$ passing through a hub of the cylinder and at the other by a nut $b'$. I also prefer to employ a center key $b^2$ as an additional securing means. The shaft is provided with the usual journals (not shown) to engage the bearings of the frame of the machine. There may be a thrust bearing at one end to prevent lateral movement. The exterior of the cylinder is provided with shallow circumferential grooves $b^5$ of such size and shape as to receive the toothed disks. These grooves are made such a distance apart as to properly space the disks when placed therein. Near each end of the cylinder is provided a larger and deeper groove $b^4$ for a purpose hereinafter explained. The shell of the cylinder is thickened at two diametrically opposed points and the exterior of the cylinder at these points is provided with two grooves $b^7$, $b^7$ a short distance apart and extending longitudinally of the cylinder. In these grooves I place the locking bars $C'$ which are movable longitudinally therein. These locking bars are four in number, two in each of the longitudinal grooves $b^7$. The disks $C$ which are annular in form, are each made in two parts or sections; each section near its end is provided on the inside with locking notches $c\ c$. Each of the bars $C'$, $C'$ is provided with as many notches $c^x$ as there are disks, as shown most clearly in Fig. 1. In order that these notches may not too greatly weaken the bars $C'$, $C'$, the part $c'$ of each disk between the notch $c^x$ and the end of the disk section is cut away, so that the notch in the locking bar may be made of less depth and will permit the part $c'$ to pass through the notch in the bars $C'$ and allow the other side of the notch to be brought against the bar. The bars $C'$, $C'$ are threaded at the outer end and such threaded portions are provided with nuts $c^2$ that work in the grooves $b^4$ of the cylinder; the portion of the cylinder B between the grooves $b^4$ and the end of the cylinder are cut away as shown at $b^x$ to permit the bars C' to move outward the desired distance, the nuts $c^2$ being held from any other than rotary movement.

In assembling the parts of the cylinder the bars C', C' are placed in the grooves $b^7$ with their notches registering with the grooves $b^5$ around the cylinder. The disk sections are then placed in position in these grooves $b^5$ and the nuts $c^2$ manipulated to draw the bars longitudinally of the cylinder until a solid portion of the bars shall engage the notch in each disk. The disks will then be held firmly in position. Should it be desired to remove the whole or a portion of any disk the nuts on the bars C', C' will be turned to bring the notches of the securing bars of the portion to be removed into registry with the disks. Such portions can then be removed and if desired another section or sections inserted in place thereof and then secured by again moving the bars C', C'. By having the bars C', C' made in two parts, the cost of manufacture is greatly reduced and it also enables any disk to be more easily removed and with less disturbance of the parts of the cylinder, than if they were made the full length of the cylinder. In order that the sections of the disks may be firmly held in place when the bars C', C' are moved to lock them in place, I prefer to form the notches on the side of the bar that contacts with the part $c'$ of each disk with the short incline $c^4$ as shown in Fig. 7. This incline is given such direction on each bar that on turning the nut of the bar, it will have a wedging action upon the part $c'$, and draw the disk firmly into place.

The teeth are secured to the disk in the following manner. The disk C is of soft iron, soft steel or other ductile metal and is provided at one side near the periphery with a concentric groove $d$, leaving the rib $c^3$ between said groove $d$ and the periphery of the disk. This rib is then grooved radially as shown at $d'$ (Fig. 6) for the reception of the teeth. The teeth E are formed of hard metal such as tempered steel and are of the form shown in Fig. 4, each having the pointed curved portion $e$, the angular portion $e'$ and between them the portion $e^2$ flattened on the front and back to fit the grooves $d'$. The grooves $d'$ and the flattened portion $e^2$ of the tooth are so proportioned that this part of the tooth can be forced into one of the grooves $d'$ by a light tap of a hammer or by applying sufficient pressure upon it. When in place the tooth will be as shown in Fig. 3, the pointed portion of the tooth $e$ will extend beyond the periphery of the disk, while the angular portion $e'$ will be in the groove $d$. The portion $e'$ will preferably be of such length that the inner end will engage the inner wall of the groove $d$. The teeth may be fastened by hammering or forcing the metal of the rib $c^3$ down upon and over the tooth as shown at $e^3$, Figs. 3 and 6, to firmly embed the tooth in the rib of the disk. I prefer to secure them by placing them in a knurling lathe. The disk being made to revolve rapidly a knurling tool is pressed against the rib $c^3$ and the metal of the disk will be forced down upon the tooth to firmly secure it. While this is being done the disk will be supported on the opposite side by a face plate or in an equivalent manner. The angular portion of the tooth will hold the tooth from being withdrawn from its socket while the flattened faces of the tooth lying in firm contact with the straight walls of the grooves $d'$, the tooth will be held from turning.

What I claim and desire to secure by Letters Patent is:—

1. In a cylinder of the character described, the combination with the main body provided with circumferential grooves, of toothed disks each consisting of two parts and means movable longitudinally of the cylinder to secure said parts in one of the grooves in said main body to form a complete disk, said securing means being also movable to permit a disk to be detached from the main body independently of all other disks.

2. In a cylinder of the character described, the combination with a main cylindrical body provided with circumferential grooves, of toothed disks each consisting of two parts and means movable longitudinally of the cylinder to independently secure the parts of the disks in one of the grooves of the main body, to form a single disk, said securing means being reversely movable to permit a section of a disk to be detached from the cylinder independently of the other section or any other disk.

3. In a cylinder of the class described, the combination with the main body of said cylinder provided with means for holding toothed disks from movement longitudinally of the cylinder, and two pairs of grooves extending lengthwise of the cylinder. toothed disks each composed of two parts, and locking bars for locking said sectional disks movably mounted in the longitudinal grooves of the cylinder.

4. In a cylinder of the character described, the combination with the main body of said cylinder provided with means for holding the disks from movement longitudinally of said cylinder and two pairs of grooves extending lengthwise of the cylinder, toothed disks each composed of two parts, and locking bars for locking said disk sections in place, mounted in said longitudinal grooves, each of said disk sections being engaged by two of said locking bars.

5. In a cylinder of the character described, the combination with the main body of the cylinder provided with circumferential grooves and two pairs of longitudinal grooves, said pairs being located diametrically opposite each other and the two grooves of each pair being located a short distance apart, toothed disks each composed of two parts each part having a locking notch near each end of the same and locking bars for locking the said disk parts in position movably mounted in said longitudinal grooves and means whereby said locking bars may be made to engage and be disengaged from said disk sections.

6. In a cylinder of the character described, the combination with the main body of the cylinder provided with circumferential grooves and two pair of longitudinal grooves, of toothed disks each composed of two parts or sections adapted to extend around the main body in said circumferential grooves, each section being provided with a locking notch near each end of the same, locking bars movably mounted in said longitudinal grooves of the main body, said locking bars being provided with notches adapted to register with the circumferential grooves of the cylinder, and means for moving said bars longitudinally of the cylinder.

7. In a cylinder of the character described, the combination with the main body of the cylinder having circumferential grooves and two pair of longitudinal grooves, of toothed disks each formed in two sections and engaging said circumferential grooves, locking bars movably mounted in said longitudinal grooves, each of said locking bars having notches adapted to register with the circumferential grooves of the main body of the cylinder and means for moving said bars longitudinally.

8. The herein described toothed disk for the cylinder of a cotton gin, consisting of a main body composed of ductile material, said disk being provided on one side with a concentric groove near its periphery and radial grooves extending from said concentric groove to the periphery of the disk and teeth of a hard metal in said radial grooves with their inner ends against the inner wall of said concentric groove and secured by the metal of the rib between said concentric groove and the periphery of the disk.

9. The herein described toothed disk for cotton gins, consisting of a main body composed of ductile material, provided on one side near its periphery with a concentric groove and radial grooves extending from said concentric groove to the periphery of the disk and teeth of a hard metal in said radial grooves with their inner ends against the inner wall of said concentric groove and secured by the metal of the disk which has been forced upon them.

10. In a cylinder of the character described, the combination with the main body of said cylinder provided with means for holding the disks from movement longitudinally of the cylinder, said cylinder being provided with two pairs of grooves extending lengthwise of the same, toothed disks each composed of two parts and having locking notches, as described, adapted to register with the grooves in said cylinder and movable locking bars in said grooves there being two bars in each of said grooves for locking the disks the entire length of the cylinder.

11. In a cylinder of the character described, the combination with the main body of the cylinder having circumferential grooves, of toothed disks each formed in two sections for engaging said circumferential grooves, said disks each having notches to register with the longitudinal grooves of said main body and movable locking bars in said longitudinal grooves, there being two bars in each of said grooves for locking the disks the entire length of the cylinder.

12. In a cylinder of the character described, the combination with the main body of the cylinder having means for preventing movement of the disks longitudinally of the cylinder and provided with two pairs of longitudinal grooves, of toothed disks each composed of two parts each part having notches to register with the said grooves of the cylinder, movable locking bars in said grooves, said bars having transverse notches to register with the sections of said toothed disks, said notches on one side of the bar being provided with an incline to wedge against part of the disk section engaged thereby.

In testimony whereof I affix my signature, in the presence of two witnesses.

JAMES T. FULLER.

Witnesses:
LUCY FULLER,
MARY J. FULLER.

---

Copies of this patent may be obtained for five cents each, by addressing the "Commissioner of Patents, Washington, D. C."